G. W. HATHAWAY.
Corn Sheller.

No. 30,403.

Patented Oct. 16, 1860.

Witnesses

Inventor
G. W. Hathaway
per Munn & Co.
attorneys

UNITED STATES PATENT OFFICE.

GEORGE W. HATHAWAY, OF TIOGA, PENNSYLVANIA.

CORN-SHELLER.

Specification of Letters Patent No. 30,403, dated October 16, 1860.

*To all whom it may concern:*

Be it known that I, G. W. HATHAWAY, of Tioga, in the county of Tioga and State of Pennsylvania, have invented a new and Improved Corn-Sheller; and I do hereby declare that the following is a full, clear, and exact description of the same, reference being had to the accompanying drawing, making a part of this specification, in which—

Figure 1:
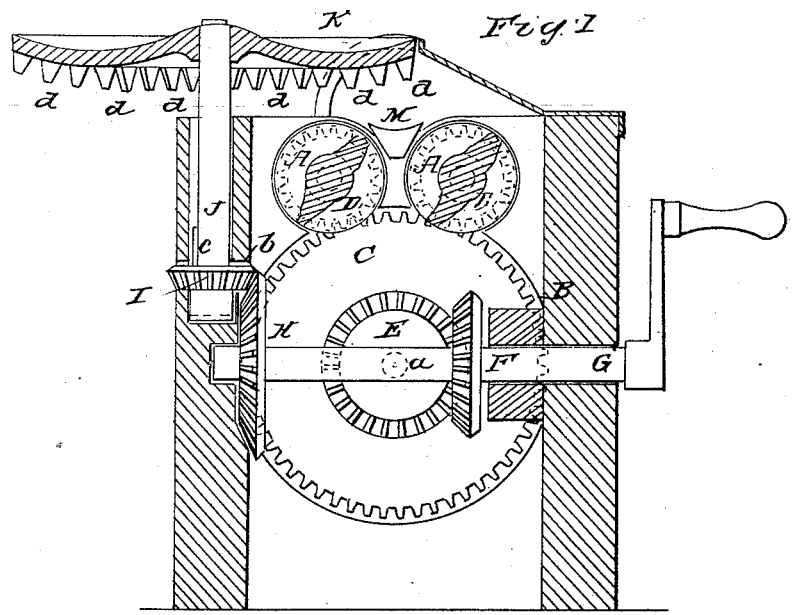
Figure 2:
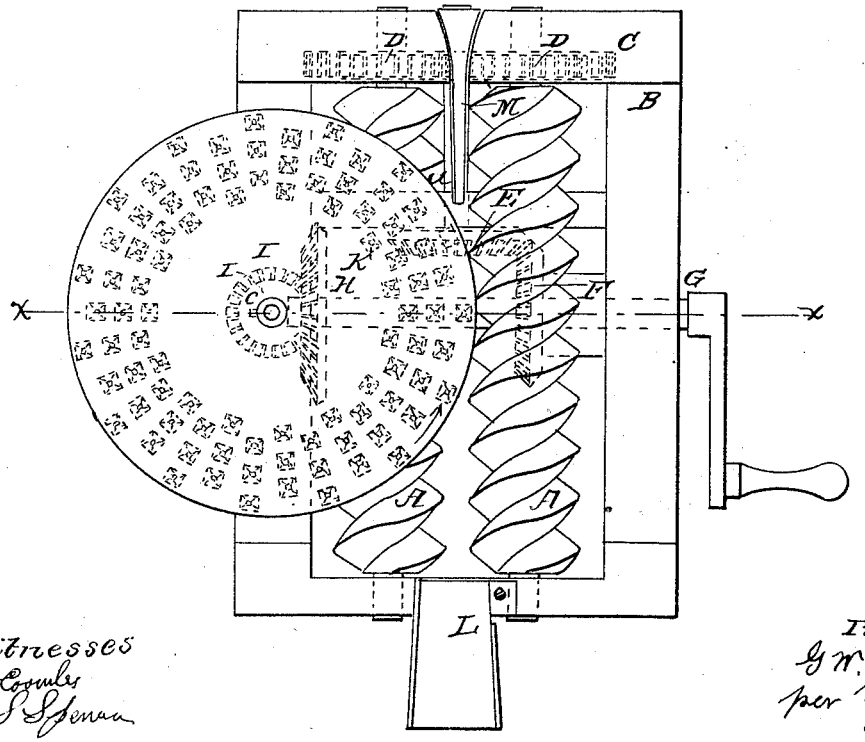

Figure 1, represents a transverse vertical section of my invention the line $x$, $x$, Fig. 2, indicating the plane of section. Fig. 2, is a plan or top view of the same, the top having been removed to expose the working parts.

Similar letters of reference in both views indicate corresponding parts.

This invention consists in the arrangement of two endless revolving screws in combination with a rotary disk having teeth on its under surface and attached to a vertical axle which rises and falls freely, in such a manner that by the action of the endless screws the ears are fed under and exposed to the action of the rotary disk, which accommodates itself to the varying diameters of the ears, thereby shelling the same from end to end.

To enable those skilled in the art to make and use my invention I will proceed to describe its construction and operation with reference to the drawing.

Two endless screws A, A, with one, two or more threads are arranged in a frame or box B, made of wood or of any other suitable material. The threads on both screws are right handed and the screws are made to rotate in the same direction by means of a large cog wheel C, gearing into two cog wheels D, D, on the ends of the axles of the screws. The effect would, however, be the same, if the thread or threads of one screw would be made right handed and those on the other screw left-handed, and in this case the rotary motion of the screws would have to take place in opposite directions.

The cog wheel C, is secured to one end of a horizontal shaft $a$, and the other end of this shaft bears a bevel wheel E, which meshes into a similar bevel wheel F, on the driving shaft G. This driving shaft extends in a horizontal direction transversely across the frame or through the box B, and a bevel wheel H, on or near its inner end gives motion to another bevel wheel I, which is attached to the lower end of a vertical shaft J. The wheel I, moves in a slot $b$, in the side of the box B, in such a manner that it is allowed to rotate freely without being able to move in a vertical direction and the shaft J, passes loosely through said wheel, being caused to rotate with the same by means of a key $c$, which slides in a corresponding groove in the wheel. The shaft J, is thereby enabled to rise and fall and the disk K, which is attached to the upper end of said shaft, is enabled to accommodate itself to the varying thickness of the cobs passing through under it.

The under surface of the disk K, is provided with teeth $d$ or it may be ribbed or made rough in any other manner, and the disk is slightly turned up near to its circumference so that the three or four outer rows of teeth are in an inclined position toward the screws A, A, whereas the inner rows are in a plane parallel to the plane passing through the centers of the screws. By this position of the teeth the ears are enabled to enter freely between the screws A, A, and the disk K, and the disk is raised sufficiently to bear with its weight on the ear and to produce the necessary friction for shelling the corn.

The ears are fed to the screws point foremost over the curved plate L, and as they are caught by the screws they are propelled and carried under the disk, which gradually rises from the point of the ear to its butt end, shelling it completely from end to end. The kernels drop down into the box B, and are collected in a suitable vessel or receptacle and the cobs are discharged by the action of the screws over the guide plate M.

The simplicity of this device is unsurpassed, it is easily operated, it can be made cheap, and all its parts are so constructed, that they do not easily get out of repair.

Having thus fully described my invention what I claim as new, and desire to secure by Letters Patent, is—

The arrangement of two endless revolving screws A, A, in combination with the rotary toothed disk K, constructed and operating substantially as and for the purpose specified.

GEORGE W. HATHAWAY.

Witnesses:
LEROY TABOR,
E. H. CORNELL.